US012581572B2

(12) United States Patent
Nakamura et al.

(10) Patent No.: US 12,581,572 B2
(45) Date of Patent: Mar. 17, 2026

(54) FILM HEATER

(71) Applicant: DENSO CORPORATION, Kariya-city (JP)

(72) Inventors: Takahito Nakamura, Kariya-city (JP); Taro Ogura, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 796 days.

(21) Appl. No.: 17/947,338

(22) Filed: Sep. 19, 2022

(65) Prior Publication Data

US 2023/0016506 A1 Jan. 19, 2023

Related U.S. Application Data

(63) Continuation of application No. PCT/JP2021/014342, filed on Apr. 2, 2021.

(30) Foreign Application Priority Data

Apr. 7, 2020 (JP) ................................. 2020-069084

(51) Int. Cl.
 H05B 3/86 (2006.01)
 B60R 13/00 (2006.01)
 (Continued)

(52) U.S. Cl.
 CPC ............. H05B 3/86 (2013.01); B60R 13/005 (2013.01); G01S 7/03 (2013.01); H05B 3/20 (2013.01)

(58) Field of Classification Search
 CPC .......... H05B 3/86; H05B 3/20; B60R 13/005; G01S 7/03
 (Continued)

(56) References Cited

U.S. PATENT DOCUMENTS

| 5,089,687 A | 2/1992 | Bartrug et al. |
| 6,175,335 B1 | 1/2001 | Ishikawa et al. |
| (Continued) | | |

FOREIGN PATENT DOCUMENTS

| JP | H04292243 A | 10/1992 |
| JP | 2000022437 A | 1/2000 |
| (Continued) | | |

OTHER PUBLICATIONS

Machine Translation of KR20110110634A (Year: 2025).*
Machine Translation of JP2018066705A (Year: 2025).*

*Primary Examiner* — Edward F Landrum
*Assistant Examiner* — Thomas J Ward
(74) *Attorney, Agent, or Firm* — Harness, Dickey & Pierce, P.L.C.

(57) ABSTRACT

A film heater has a transparent conductive portion including: at least one non-conductive portion that has electrical insulation properties and extends in a direction intersecting a vibration direction of an electric field included in a radio wave transmitted from a radio wave transmitter-receiver; and a heat generator that generates heat by being energized and that transmits light. The film heater has: a first electrode connected to the heat generator; and a second electrode connected to the heat generator. The heat generator includes at least one conductive portion that is adjacent to the non-conductive portion and generates heat by a current flowing along a direction in which the non-conductive portion extends when the heat generator is energized by the first electrode and the second electrode.

7 Claims, 12 Drawing Sheets

(51) Int. Cl.
    *G01S 7/03*           (2006.01)
    *H05B 3/20*           (2006.01)

(58) Field of Classification Search
    USPC .......................................................... 219/202
    See application file for complete search history.

(56)             References Cited

U.S. PATENT DOCUMENTS

| | | |
|---|---|---|
| 2017/0352938 A1 | 12/2017 | Okumura et al. |
| 2019/0232886 A1 | 8/2019 | Okumura et al. |
| 2019/0293763 A1 | 9/2019 | Okumura et al. |
| 2019/0322224 A1 | 10/2019 | Okumura et al. |

FOREIGN PATENT DOCUMENTS

| | | | | |
|---|---|---|---|---|
| JP | 2017215243 A | | 12/2017 | |
| JP | 2018066705 A | * | 4/2018 | ........... G01S 13/931 |
| JP | 2019168345 A | | 10/2019 | |
| JP | 2020044869 A | | 3/2020 | |
| KR | 20110110634 A | * | 10/2011 | ............... H05B 3/12 |

* cited by examiner 351
410

35

311
353
512
50
511
421

41
411

42

UP

RIGHT ← → LEFT
FRONT-REAR

DOWN

VIBRATION
DIRECTION OF
ELECTRIC FIELD

VIBRATION DIRECTION
OF MAGNETIC FIELD

TRAVEL
DIRECTION OF
RADIO WAVE

VIBRATION DIRECTION
OF MAGNETIC FIELD

TRAVEL DIRECTION
OF RADIO WAVE

VIBRATION DIRECTION
OF ELECTRIC FIELD

UP

LEFT
FRONT–REAR

RIGHT

DOWN

FILM HEATER

CROSS REFERENCE TO RELATED APPLICATION

The present application is a continuation application of International Patent Application No. PCT/JP2021/014342 filed on Apr. 2, 2021, which designated the U.S. and claims the benefit of priority from Japanese Patent Application No. 2020-069084 filed on Apr. 7, 2020. The entire disclosures of all of the above applications are incorporated herein by reference.

TECHNICAL FIELD

The present disclosure relates to a film heater.

BACKGROUND ART

A heater is used for an emblem that is able to transmit millimeter waves. The heater includes a heat generator having a linear shape, and the heater generator generates heat by being energized.

SUMMARY

According to an aspect of the present disclosure, a film heater has a transparent conductive portion including: at least one non-conductive portion that has electrical insulation properties and extends in a direction intersecting a vibration direction of an electric field included in a radio wave transmitted from a radio wave transmitter-receiver; and a heat generator that generates heat by being energized and that transmits light. The film heater has: a first electrode connected to the heat generator; and a second electrode connected to the heat generator. The heat generator includes at least one conductive portion that is adjacent to the non-conductive portion and generates heat by a current flowing along a direction in which the non-conductive portion extends when the heat generator is energized by the first electrode and the second electrode.

DESCRIPTION OF EMBODIMENTS

Figure 1:
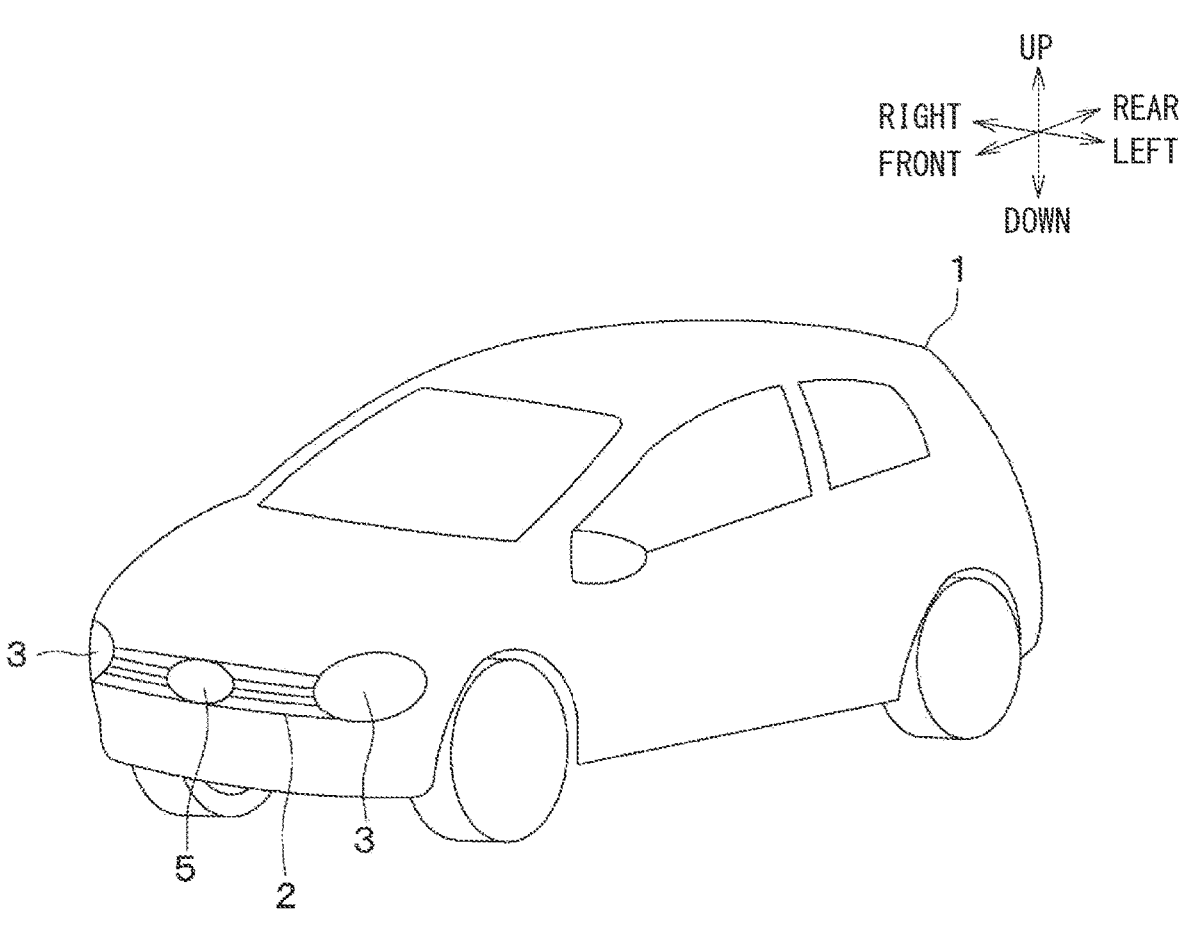
FIG. 1 is a configuration diagram of a vehicle to which an emblem using a film heater of a first embodiment is attached.

To begin with, examples of relevant techniques will be described.

Conventionally, a heater is known, which is used for an emblem that is able to transmit millimeter waves. The heater includes a heat generator having a linear shape, and the heater generator generates heat by being energized.

According to a study of the inventors, in order to reduce the variation in the temperature distribution in the emblem, a heat generator is sometimes formed not in a linear shape but in a planar shape. However, in a case where the heat generator has a planar shape, a conductive portion of the heat generator is larger than in a case where the heat generator has a linear shape. For this reason, in an emblem including a planar heat generator, radio waves such as millimeter waves are easily absorbed as compared with the case of an emblem including a linear heat generator. Therefore, the radio wave transmitted toward an emblem including a planar heat generator is more largely attenuated than the radio wave transmitted toward an emblem including a linear heat generator. Therefore, when a planar heat generator is applied to an emblem, the radio wave transmitted toward the emblem may not appropriately pass through the emblem, in some cases. The present disclosure provides a film heater that reduces attenuation of radio waves.

According to an aspect of the present disclosure, a film heater has a transparent conductive portion including: at least one non-conductive portion that has electrical insulation properties and extends in a direction intersecting a vibration direction of an electric field included in a radio wave transmitted from a radio wave transmitter-receiver; and a heat generator that generates heat by being energized and that transmits light. The film heater has: a first electrode connected to the heat generator; and a second electrode connected to the heat generator. The heat generator includes at least one conductive portion that is adjacent to the non-conductive portion and generates heat by a current flowing along a direction in which the non-conductive portion extends when the heat generator is energized by the first electrode and the second electrode.

Since the non-conductive portion has electrical insulation properties, the non-conductive portion hardly absorbs the radio wave transmitted from the radio wave transmitter-receiver. As a result, attenuation of the radio wave is reduced. In addition, the non-conductive portion extends in a direction intersecting the vibration direction of the electric field included in the radio wave transmitted from the radio wave transmitter-receiver. As a result, a length of the conductive portion of the heat generator in the vibration direction of the electric field is smaller. Therefore, the portion of the heat generator that is dielectrically polarized by an action of the electric field included in the radio wave is smaller. This reduces absorption of the energy of the radio wave and conversion of the energy into thermal energy that are caused by the dielectric polarization of the heat generator due to the action of the electric field included in the radio wave. Accordingly, attenuation of the radio wave is reduced.

Parenthesized reference signs attached to the respective constituent elements and the like indicate an example of a correspondence relationship between the constituent elements and the like and specific constituent elements and the like described in the embodiments described later.

Hereinafter, embodiments will be described with reference to the drawings. In the following embodiments, portions that are mutually the same or equivalent are denoted by the same reference signs, and the description thereof will be omitted.

First Embodiment

A film heater 20 of a first embodiment is used for an emblem 5 of a vehicle 1. First, the vehicle 1 will be described.

Figure 2:
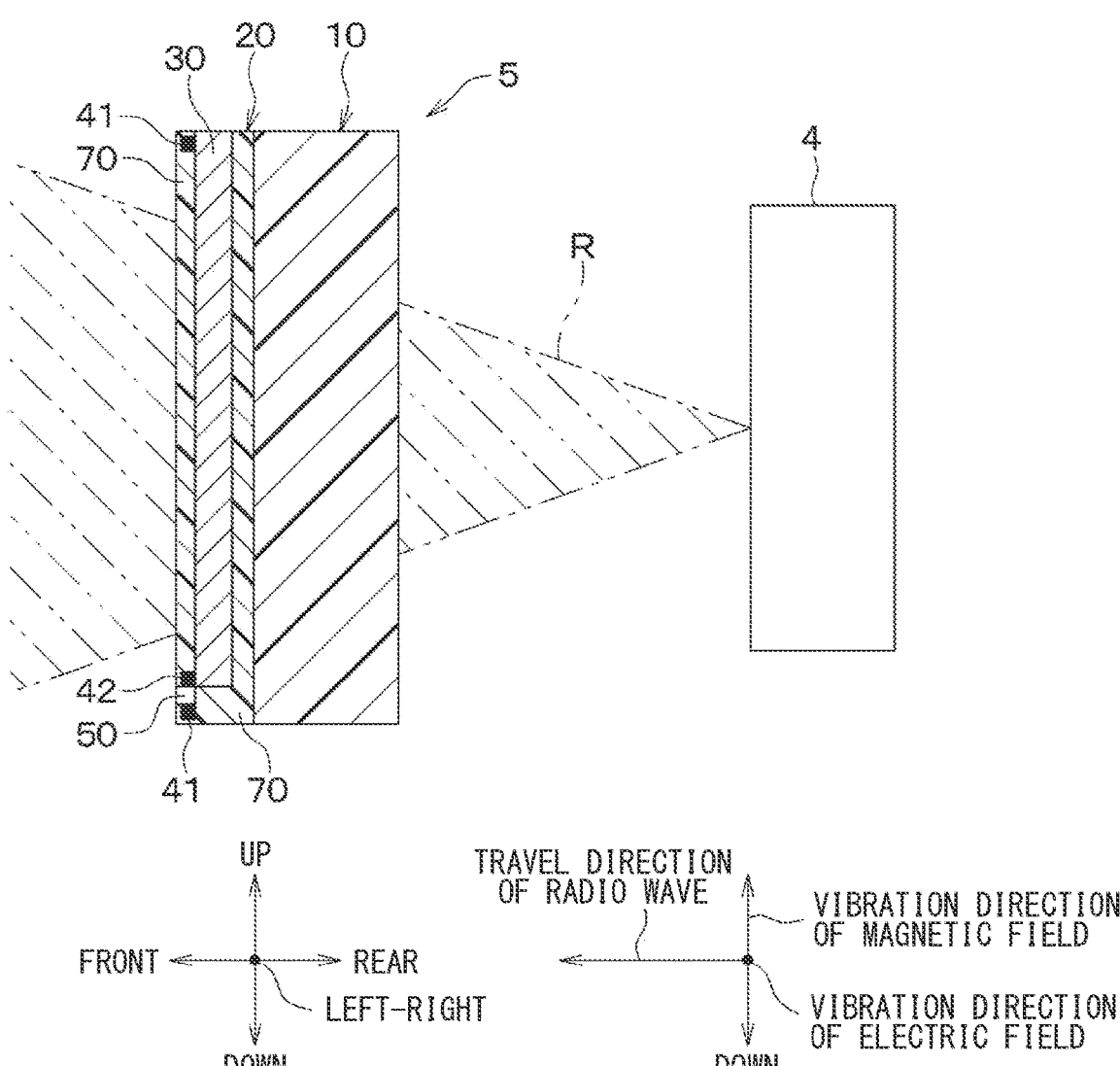
FIG. 2 is a cross-sectional view of the film heater.

As illustrated in FIGS. 1 and 2, the vehicle 1 includes a front grille 2, headlights 3, a radio wave transmitter-receiver 4, and an emblem 5. In the following description, the upper side with respect to the front direction of the vehicle 1 will be simply referred to as the upper side as appropriate for the sake of description. The lower side with respect to the front direction of the vehicle 1 will be simply described as the lower side as appropriate. The left side with respect to the front direction of the vehicle 1 will be simply described as the left side as appropriate. The right side with respect to the front direction of the vehicle 1 will be simply described as the right side as appropriate.

The front grille 2 is disposed on the front side of the vehicle 1. The front grille 2 is disposed between the two headlights 3. The front grille 2 introduces air outside the vehicle 1 into an engine room of the vehicle 1.

As illustrated in FIG. 2, the radio wave transmitter-receiver 4 transmits a radio wave to an object (not illustrated) in front of the vehicle 1. The transmitted radio wave passes through the emblem 5 to be described later and is reflected by the object in front of the vehicle 1. The radio wave reflected by the object passes through the emblem 5. Then, the radio wave transmitter-receiver 4 receives the radio wave reflected by the object. The radio wave transmitter-receiver 4 outputs a signal corresponding to a relative speed and a relative position of the object in front of vehicle 1 on the basis of information obtained from the transmitted and received radio wave. In FIG. 2, an irradiation range R of the radio wave transmitted from the radio wave transmitter-receiver 4 is schematically indicated by a two-dot chain line.

The radio wave transmitted by the radio wave transmitter-receiver 4 is, for example, a millimeter wave. The millimeter wave is a radio wave having a wavelength of 1 to 10 mm and a frequency of 30 to 300 GHz. In the present embodiment, the traveling direction of the radio wave transmitted from the radio wave transmitter-receiver 4 coincides with the front direction of the vehicle 1. The vibration direction of the electric field included in the radio wave is orthogonal to the traveling direction of the radio wave. Therefore, in the present embodiment, the vibration direction of the electric field included in the radio wave coincides with the horizontal direction of the vehicle 1. The vibration direction of the magnetic field included in the radio wave is orthogonal to the traveling direction of the radio wave and the vibration direction of the electric field included in the radio wave. Therefore, in the present embodiment, the vibration direction of the magnetic field included in the radio wave coincides with the vertical direction of the vehicle 1. The traveling direction of the radio wave, the vibration direction of the electric field included in the radio wave, and the vibration direction of the magnetic field included in the radio wave are determined by, for example, the orientation in which the radio wave transmitter-receiver 4 is disposed.

As shown in FIG. 1, in the present embodiment, the emblem 5 is disposed on the front grille 2. As illustrated in FIG. 2, the emblem 5 is disposed on the front side of the vehicle 1 with respect to the radio wave transmitter-receiver 4 so that the radio wave transmitter-receiver 4 cannot be seen from the outside of the vehicle 1. This configuration improves the appearance of the vehicle 1.

The vehicle 1 is configured as described above.

Next, the emblem 5 used in the vehicle 1 will be described.

Figure 3:
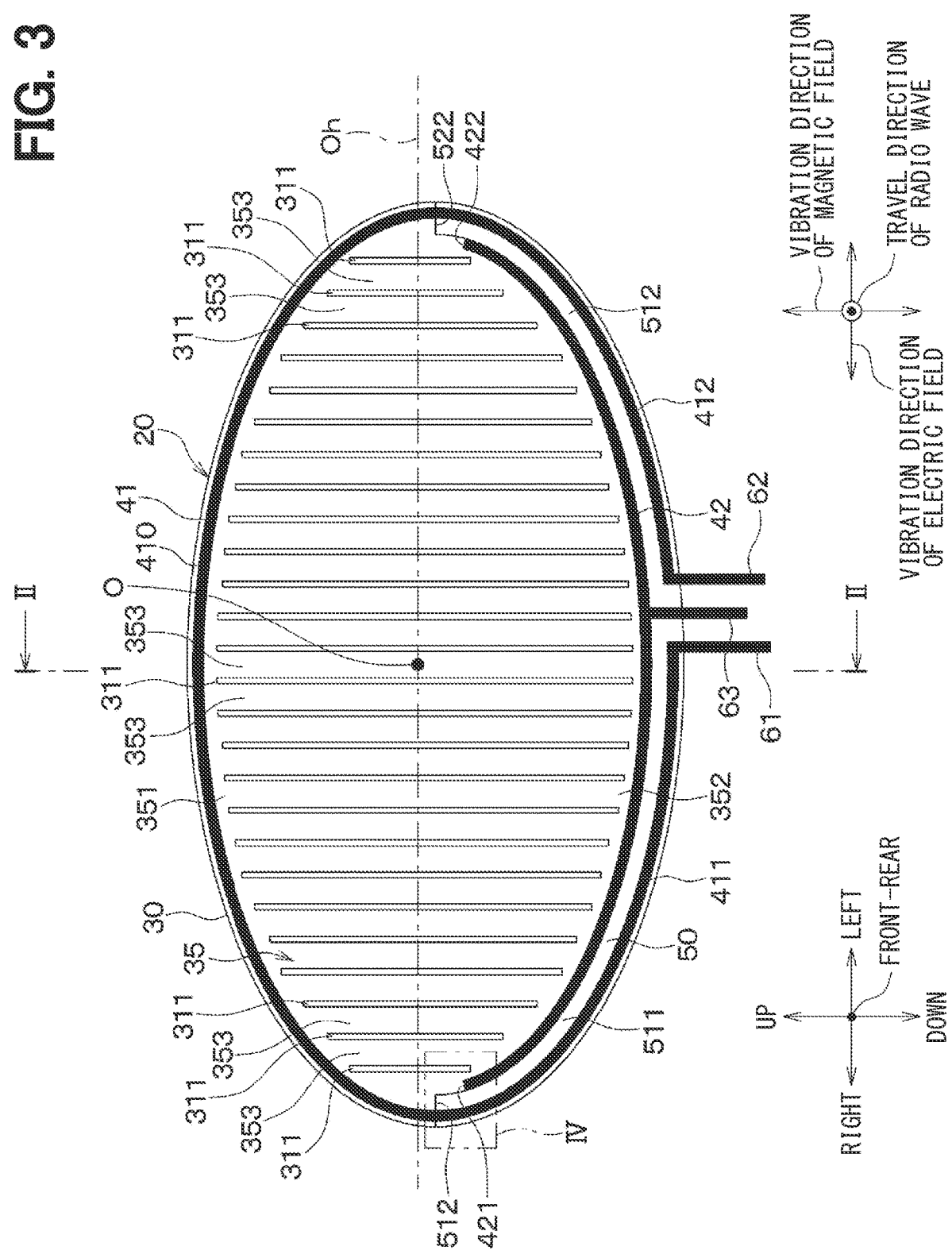
FIG. 3 is a front view of the film heater.

As illustrated in FIGS. 2 and 3, the emblem 5 includes a base member 10, a design layer (not illustrated), and the film heater 20.

The base member 10 is formed of resin in an elliptical plate shape. The resin used for the base member 10 is, for example, AES having a relatively small dielectric loss tangent. The dielectric loss tangent is an index value representing the degree of electric energy loss in a dielectric. As the dielectric loss tangent is smaller, radio waves such as millimeter waves are less absorbed and are less converted into thermal energy. The AES is a copolymer of acryloni-trile-ethylene-styrene.

The design layer (not illustrated) is formed on the base member 10. This design layer improves the appearance of the vehicle 1.

The film heater 20 is disposed on the base member 10. The film heater 20 has a thickness of, for example, 100 to 500 μm. Specifically, as illustrated in FIG. 3, the film heater 20 includes a transparent conductive film 30, a first electrode 41, a second electrode 42, an inter-electrode non-conductive portion 50, a first lead wire 61, a second lead wire 62, a third lead wire 63, and a transparent insulating film 70.

The transparent conductive film 30 corresponds to a transparent conductive portion, and is formed in a shape corresponding to a substrate, in the present embodiment, formed in an elliptical shape. The transparent conductive film 30 is made of ITO, carbon nanotubes, or the like. Therefore, the transparent conductive film 30 is transparent and has conductivity. Specifically, the transparent conductive film 30 has slits 311 and a heat generator 35. ITO is an abbreviation for indium tin oxide.

The slits 311 correspond to non-conductive portions, and extend in a direction intersecting the traveling direction of the radio wave transmitted from the radio wave transmitter-receiver 4 and the vibration direction of the electric field included in the radio wave. Specifically, the slits 311 extend in the direction orthogonal to the traveling direction of the radio wave transmitted from radio wave transmitter-receiver 4 and the vibration direction of the electric field included in the radio wave, in the present embodiment, extends in the vertical direction of the vehicle 1. The slits 311 extend parallel to the vibration direction of the magnetic field included in the radio wave. Further, the slits 311 are arranged in parallel at equal intervals in the vibration direction of the electric field included in the radio wave, in the present embodiment, arranged in parallel at equal intervals in the horizontal direction of the vehicle 1. As a result, conductive portions 353, to be described later, of the heat generator 35 are formed between the slits 311 adjacent to each other. Because, for example, air or the like having electrical insulation properties is contained in the slits 311, the slits 311 have electrical insulation properties. The width of the slits 311, which is the length of the slits 311 in the horizontal direction of the vehicle 1 in the present embodiment, is 25 μm or more, for example.

Since the transparent conductive film 30 has an elliptical shape in the present embodiment, the length of the transparent conductive film 30 in the vertical direction of the vehicle 1 decreases from the center O of the transparent conductive film 30 toward the horizontal direction of the vehicle 1. In accordance with this configuration, the length of each of the slits 311 in the vertical direction of the vehicle 1 decreases from the center O of the transparent conductive film 30 toward the parallel arrangement direction of the slits 311.

The heat generator 35 is formed in a planar shape and generates heat by a current flowing through the heat generator 35. Specifically, the heat generator 35 includes an upper outer edge portion 351, a lower outer edge portion 352, and the plural conductive portions 353.

The upper outer edge portion 351 is an outer edge peripheral portion of the heat generator 35 on the upper side with respect to the horizontal center line Oh extending in the horizontal direction of the vehicle 1.

The lower outer edge portion 352 is an outer edge peripheral portion of the heat generator 35 on the lower side with respect to the horizontal center line Oh extending in the horizontal direction of the vehicle 1.

The conductive portions 353 are connected to the upper outer edge portion 351 and the lower outer edge portion 352. The conductive portions 353 are formed such that the inner part of the heat generator 35 is divided by the slits 311, and are adjacent to the slits 311. Therefore, the conductive portions 353 extend in the direction in which the slits 311 extend. Specifically, the conductive portions 353 extend in the direction orthogonal to the traveling direction of the radio wave transmitted from radio wave transmitter-receiver 4 and the vibration direction of the electric field included in the radio wave, in the present embodiment, extend in the vertical direction of the vehicle 1. The conductive portions 353 extend parallel to the vibration direction of the magnetic field included in the radio wave. The conductive portions 353 are arranged in parallel in the parallel arrangement direction of the slits 311. Further, the width of the conductive portion 353, in the present embodiment, the length of the conductive portions 353 in the horizontal direction of the vehicle 1 is 25 μm or more and 500 μm or less, for example. The widths of the conductive portions 353 are equal in the present embodiment. As described above, in the present embodiment, the length of each of the slits 311 in the vertical direction of the vehicle 1 decreases from the center O of the transparent conductive film 30 toward the parallel arrangement direction of the slits 311. In accordance with this configuration, the length of each of the conductive portions 353 in the vertical direction of the vehicle 1 decreases from the center O of the transparent conductive film 30 toward the parallel arrangement direction of the slits 311.

In the present embodiment, the first electrode 41 is a positive electrode. As illustrated in FIG. 2, the first electrode 41 is disposed outside the irradiation range R of the radio wave transmitted from the radio wave transmitter-receiver 4. The first electrode 41 is connected to the heat generator 35. Specifically, as illustrated in FIG. 3, the first electrode 41 includes a connection portion 410, a first lead portion 411, and a second lead portion 412.

The connection portion 410 is connected to the upper outer edge portion 351 of the heat generator 35. The connection portion 410 extends in a direction along the upper outer edge portion 351.

The first lead portion 411 is connected to the right-side end of the connection portion 410. The first lead portion 411 extends in a direction along the lower outer edge portion 352 from the right-side end of the connection portion 410.

The second lead portion 412 is connected to the left-side end of the connection portion 410. The second lead portion 412 extends in a direction along the lower outer edge portion 352 from the left-side end of the connection portion 410.

In the present embodiment, the second electrode 42 is a negative electrode. As illustrated in FIG. 2, the second electrode 42 is disposed outside the irradiation range R of the radio wave transmitted from the radio wave transmitter-receiver 4. As illustrated in FIG. 3, the second electrode 42 is connected to the lower outer edge portion 352 of the heat generator 35. The second electrode 42 is disposed inside the heat generator 35 with respect to the first lead portion 411 and the second lead portion 412 of the first electrode 41. As a result, the second electrode 42 is surrounded by the first electrode 41 and faces the first lead portion 411 and the second lead portion 412 of the first electrode 41 with an inter-electrode non-conductive portion 50 to be described later interposed therebetween.

The inter-electrode non-conductive portion 50 is disposed between the first electrode 41 and the second electrode 42, and has electrical insulation properties. Specifically, the inter-electrode non-conductive portion 50 includes a first gap 511, a first boundary portion 512, a second gap 521, and a second boundary portion 522.

The first gap 511 is formed between the first lead portion 411 of the first electrode 41 and the second electrode 42. The first gap 511 extends in a direction along the first lead portion 411 of the first electrode 41 and the second electrode 42. Because air or the like having electrical insulation properties is contained in the first gap 511, the inter-electrode non-conductive portion 50 has electrical insulation properties.

Figure 4:
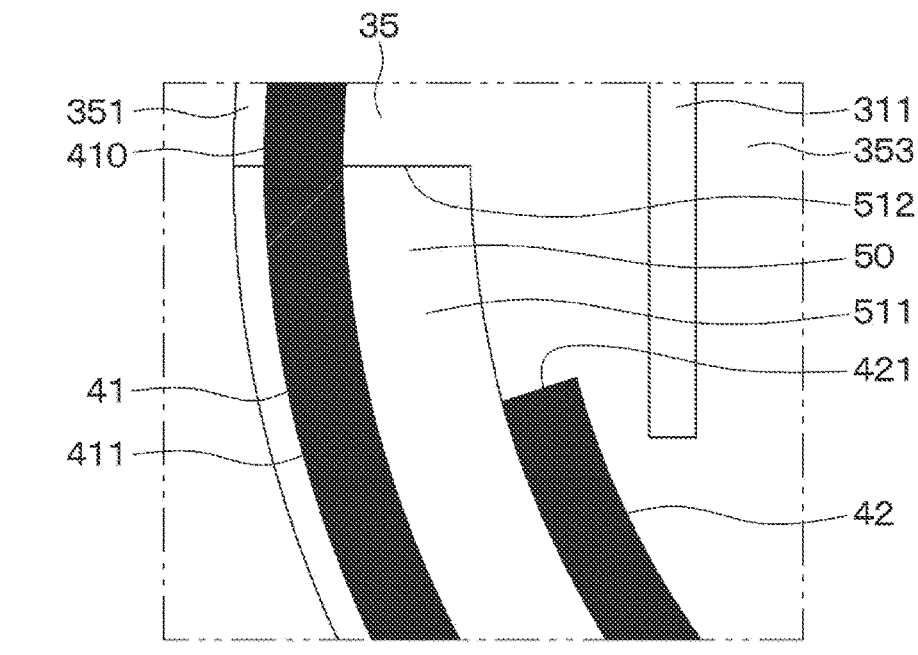
FIG. 4 is an enlarged view of IV part in FIG. 3.
Figure 4:

The first boundary portion 512 is a boundary portion between the heat generator 35 of the transparent conductive film 30 and the first gap 511. As illustrated in FIG. 4, a part of the first boundary portion 512 is connected to the connection portion 410 of the first electrode 41. The first boundary portion 512 is located between the connection portion 410 of the first electrode 41 and a first end 421 of the second electrode 42 on the right side.

As illustrated in FIG. 3, the second gap 521 is formed between the second lead portion 412 of the first electrode 41 and the second electrode 42. The second gap 521 extends in a direction along the second lead portion 412 of the first electrode 41 and the second electrode 42. Because air or the like having electrical insulation properties is contained in the second gap 521, the inter-electrode non-conductive portion 50 has electrical insulation properties.

The second boundary portion 522 is a boundary portion between the heat generator 35 of the transparent conductive film 30 and the second gap 521. A part of the second boundary portion 522 is connected to the connection portion 410 of the first electrode 41. Similarly to the first boundary portion 512, the second boundary portion 522 is located between the connection portion 410 of the first electrode 41 and a second end 422 of the second electrode 42 on the left side.

The first lead wire 61 is connected to the left-side end of the first lead portion 411 of the first electrode 41, in other words, a lower-side end of the entire first electrode 41. The first lead wire 61 extends downward from the left-side end of the first lead portion 411 of the first electrode 41, and is connected to a power supply (not illustrated).

The second lead wire 62 is connected to the right-side end of the second lead portion 412 of the first electrode 41, in other words, a lower-side end of the entire first electrode 41. The second lead wire 62 extends downward from the right-side end of the second lead portion 412 of the first electrode 41, and is connected to the power supply (not illustrated).

The third lead wire 63 is connected to the lower side of the second electrode 42. As a result, the third lead wire 63 is disposed, together with the first lead wire 61 and the second lead wire 62, on one side in a direction intersecting the vibration direction of the electric field included in the radio wave transmitted from the radio wave transmitter-receiver 4, in the present embodiment, disposed on the lower side of the film heater 20. The third lead wire 63 extends downward from a connection point between the third lead wire 63 and the second electrode 42 and is connected to the power supply (not illustrated).

The transparent insulating film 70 is formed, for example, to cover the transparent conductive film 30, the first electrode 41, and the second electrode 42, and has electrical insulation properties. The transparent insulating film 70 is formed of, for example, a resin such as polycarbonate.

The emblem 5 is configured as described above. The emblem 5 is heated by the film heater 20, and at the same time, attenuation of radio waves such as millimeter waves is reduced.

Next, heating by the film heater 20 will be described.

In the present embodiment, the first electrode 41 is a positive electrode, and the second electrode 42 is a negative electrode. Therefore, when the power supply (not illustrated) supplies power to the film heater 20, a current flows from the power supply (not illustrated) to the upper outer edge portion 351 of the heat generator 35 via the first lead wire 61, the first lead portion 411 of the first electrode 41, and the connection portion 410. In addition, a current flows from the power supply (not illustrated) to the upper outer edge portion 351 of the heat generator 35 via the second lead wire 62, the second lead portion 412 of the first electrode 41, and the connection portion 410.

In the heat generator 35, the upper outer edge portion 351 is connected to each of the parallelly arranged conductive portions 353. As a result, the current flowing through the upper outer edge portion 351 flows through each of the conductive portions 353. In addition, each of the conductive portions 353 extends in the direction in which the slits 311 extend from the upper outer edge portion 351, and is connected to the lower outer edge portion 352. Therefore, the current flowing through each of the conductive portions 353 flows along the direction in which the slits 311 extend, and flows to the lower outer edge portion 352. The current flowing through the lower outer edge portion 352 flows to the third lead wire 63 via the second electrode 42.

Therefore, in the present embodiment, in the heat generator 35, since the current flows through each of the parallelly arranged conductive portions 353, the circuit of the current flowing through the first electrode 41, the heat generator 35, and the second electrode 42 is a parallel circuit.

Since the current flows through each of the conductive portions 353 as described above, the entire planar heat generator 35 generates heat. Accordingly, the unevenness in the temperature distribution in the film heater 20 can be made relatively small, so that the film heater 20 can reduce unevenness in the temperature distribution in the emblem 5. Therefore, the emblem 5 can uniformly remove water such as snow or rain adhering to the emblem 5.

As described above, the film heater 20 generates heat. The film heater 20 reduces attenuation of radio waves such as millimeter waves. Hereinafter, the reduction of the attenuation of radio waves will be described.

The transparent conductive film 30 of the film heater 20 has slits 311 and a heat generator 35. The slits 311 have electrical insulation properties and therefore hardly absorbs the radio wave transmitted from the radio wave transmitter-receiver 4. For this reason, attenuation of radio waves such as millimeter waves is reduced.

The slits 311 extend in a direction intersecting the vibration direction of the electric field included in the radio wave transmitted from the radio wave transmitter-receiver 4. As a result, the length of the heat generator 35 in the vibration direction of the electric field, in the present embodiment, the length of the conductive portions 353 in the vibration direction of the electric field is made smaller. As a result, the portion of the heat generator 35 that is dielectrically polarized by an action of the electric field included in the radio wave is smaller. This reduces absorption of the energy of the radio wave and conversion of the energy into thermal energy that are caused by the dielectric polarization of the heat generator 35 due to an action of the electric field included in the radio wave. As a result, attenuation of radio waves such as millimeter waves is reduced.

The film heater 20 also provides effects as described below.

[1] The first lead wire 61, the second lead wire 62, and the third lead wire 63 extend in a direction intersecting the vibration direction of the electric field included in the radio wave transmitted from the radio wave transmitter-receiver 4. Specifically, the first lead wire 61, the second lead wire 62, and the third lead wire 63 extend downward of the vehicle 1 and intersect the vibration direction of the electric field, which coincides with the horizontal direction of the vehicle 1. As a result, it is possible to reduce the length, in the vibration direction of the electric field, of each of the first lead wire 61, the second lead wire 62, and the third lead wire 63. As a result, similarly to the above, absorption of the energy of the radio wave and conversion of the energy into thermal energy that are caused by the dielectric polarization of the first lead wire 61, the second lead wire 62, and the third lead wire 63 due to an action of the electric field included in the radio wave is reduced. Therefore, attenuation of radio waves such as millimeter waves is reduced. The first lead wire 61 is disposed, together with the second lead wire 62 and the third lead wire 63, on one side of the film heater 20 in a direction intersecting the vibration direction of the electric field included in the radio wave transmitted from the radio wave transmitter-receiver 4. Specifically, the first lead wire 61 is disposed, together with the second lead wire 62 and the third lead wire 63, on the lower side of the film heater 20. As a result, similarly to the above, it is possible to reduce the length, in the vibration direction of the electric field, of each of the first lead wire 61, the second lead wire 62, and the third lead wire 63. Therefore, similarly to the above, attenuation of radio waves such as millimeter waves is reduced.

[2] The First lead wire 61 is disposed, together with the second lead wire 62 and the third lead wire 63, on one side of the film heater 20. As a result, the first lead wire 61, the second lead wire 62, and the third lead wire 63 are gathered and therefore can be easily connected to the power supply (not illustrated).

[3] The first electrode 41 is disposed outside the heat generator 35 with respect to the second electrode 42 so as to surround the second electrode 42. The inter-electrode non-conductive portion 50 is disposed between the first electrode 41 and the second electrode 42. The boundary portions between the inter-electrode non-conductive portion 50 and the heat generator 35 are disposed between the connection portion 410 of the first electrode 41 and the ends of the second electrode 42. Specifically, the first boundary portion 512 of the inter-electrode non-conductive portion 50 is located between the connection portion 410 of the first electrode 41 and the first end 421 of the second electrode 42 on the right side. The second boundary portion 522 of the inter-electrode non-conductive portion 50 is located between the connection portion 410 of the first electrode 41 and the second end 422 of the second electrode 42 on the left side. This configuration prevents or reduces the chance that the first electrode 41 and the second electrode 42 will be electrically conducted to each other and be short-circuited.

[4] The first electrode 41 and the second electrode 42 are disposed outside the irradiation range R of the radio wave transmitted from the radio wave transmitter-receiver 4. This configuration reduces absorption of the energy of the radio wave and conversion of the energy into thermal energy that are caused by the dielectric polarization of the first electrode 41 and the second electrode 42 due to an action of the electric field included in the radio wave. Therefore, attenuation of radio waves such as millimeter waves is reduced.

[5] Here, in the case of a linear heating element, the heating element is longer; therefore, the electric resistance of the heating element is relatively large, so that the linear heating element generates a relatively small amount of heat when a certain voltage is applied the heating element.

In the present embodiment, in the planar heat generator 35, the conductive portions 353 are arranged in the parallel arrangement direction of the slits 311. Each of the parallelly arranged conductive portions 353 is connected to the upper outer edge portion 351 and the lower outer edge portion 352 of the heat generator 35; therefore, the circuit of the current flowing through the first electrode 41, the heat generator 35, and the second electrode 42 is a parallel circuit. As a result, when a certain voltage is applied between the first electrode 41 and the second electrode 42 by the power supply (not illustrated), the voltages applied to respective ones of the conductive portions 353 are the same. Therefore, on the parallel circuit, since the conductive portions 353 are arranged in parallel, an inverse of the overall resistance of the heat generator 35 can be made larger; therefore, the overall resistance of the heat generator 35 can be made smaller. Therefore, when a certain voltage is applied between the first electrode 41 and the second electrode 42 by the power supply (not illustrated), the amount of heat generated by the heat generator 35 can be made larger than in the case of a linear heating element. As a result, for example, even when the certain voltage between the first electrode 41 and the second electrode 42 is low, it is possible to enable the heat generator 35 to generate a larger amount of heat than in the case of a linear heating element.

Second Embodiment

In a second embodiment, the vibration direction of the electric field included in the radio wave transmitted from the radio wave transmitter-receiver 4 is different. In addition, the shapes of the slits 311, the heat generator 35, the first electrode 41, the second electrode 42, the inter-electrode non-conductive portion 50, the first lead wire 61, the second lead wire 62, and the third lead wire 63 are different. The other components are similar to those of the first embodiment.

Figure 5:
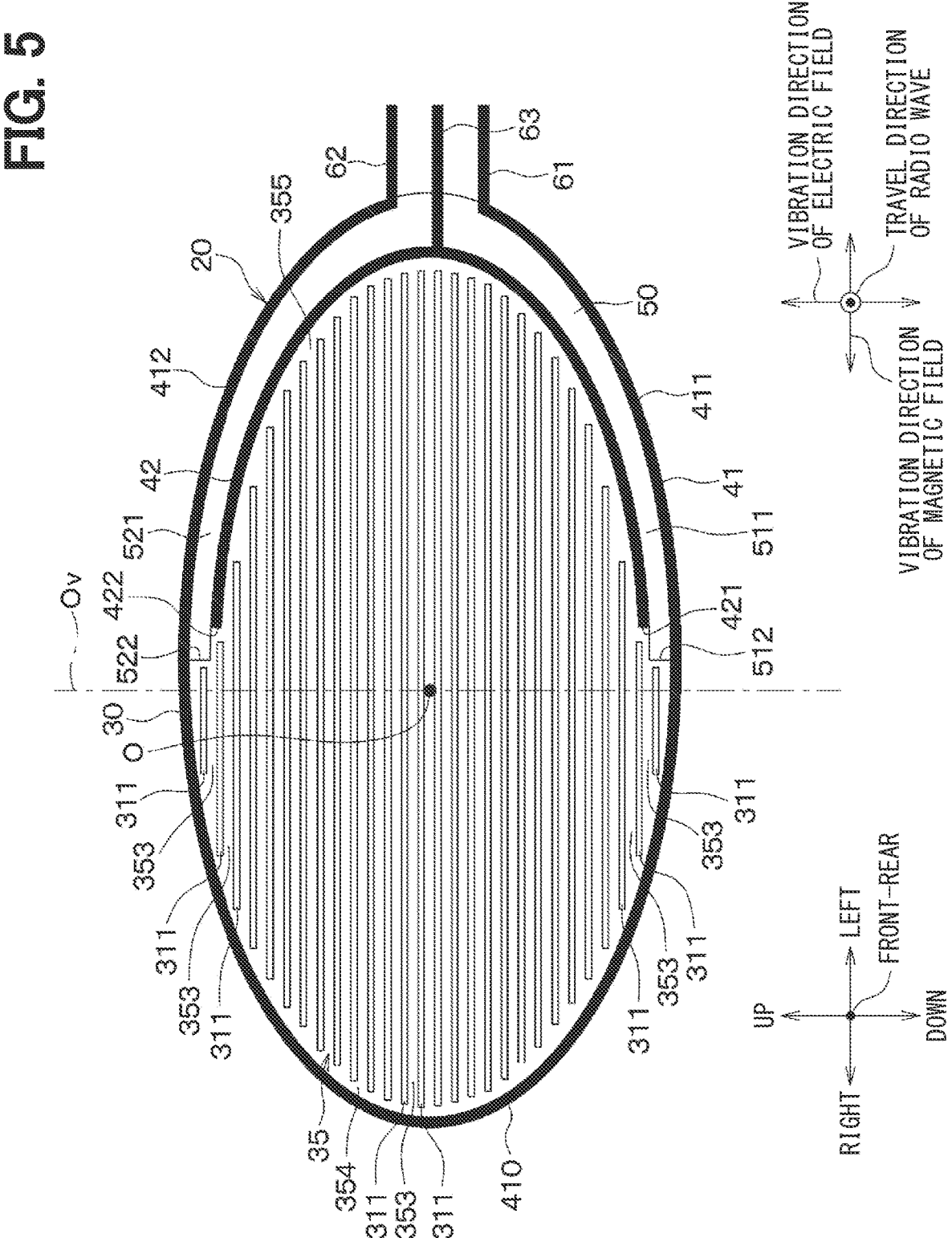
FIG. 5 is a front view of a film heater according to a second embodiment.

The traveling direction of the radio wave transmitted from the radio wave transmitter-receiver 4 coincides with the front direction of the vehicle 1 similarly to the above. In the present embodiment, the vibration direction of the electric field included in the radio wave coincides with the vertical direction of the vehicle 1 as illustrated in FIG. 5. In this case, the vibration direction of the magnetic field included in the radio wave coincides with the horizontal direction of the vehicle 1.

The slits 311 are orthogonal to the vibration direction of the electric field included in the radio wave and extend in the horizontal direction of the vehicle 1, in the present embodiment. The slits 311 extend parallel to the vibration direction of the magnetic field included in the radio wave transmitted from the radio wave transmitter-receiver 4, in the present embodiment, extend parallel to the horizontal direction of the vehicle 1. The slits 311 are arranged in parallel in the vibration direction of the electric field included in the radio wave transmitted from radio wave transmitter-receiver 4, in the present embodiment, arranged in parallel in the vertical direction of vehicle 1. Since the transparent conductive film 30 has an elliptical shape in the present embodiment, the length of the transparent conductive film 30 in the horizontal direction of the vehicle 1 decreases from the center O of the transparent conductive film 30 toward the vertical direction of the vehicle 1. In accordance with this configuration, the length of each of the slits 311 in the horizontal direction of the vehicle 1 decreases from the center O of the transparent conductive film 30 toward the parallel arrangement direction of the slits 311.

The heat generator 35 includes a left-side outer edge portion 354, a right-side outer edge portion 355, and plural conductive portions 353.

The left-side outer edge portion 354 is an outer edge peripheral portion of the heat generator 35 on the left side with respect to a vertical center line Ov extending in the vertical direction of the vehicle 1.

The right-side outer edge portion 355 is an outer edge peripheral portion of the heat generator 35 on the right side with respect to the vertical center line Ov extending in the vertical direction of the vehicle 1.

The conductive portions 353 extend in the direction in which the slits 311 extend, in the present embodiment, the conductive portions 353 extend in the horizontal direction of the vehicle 1. The conductive portions 353 are arranged in parallel in the parallel arrangement direction of the slits 311, in the present embodiment, arranged in parallel in the vertical direction of the vehicle 1. The length of each of the conductive portions 353 in the horizontal direction of the vehicle 1 decreases from the center O of the transparent conductive film 30 toward the parallel arrangement direction of the slits 311.

Similarly to the above, the first electrode 41 is a positive electrode. The first electrode 41 is disposed outside the irradiation range R of the radio wave transmitted from the radio wave transmitter-receiver 4. Specifically, the first electrode 41 includes a connection portion 410, a first lead portion 411, and a second lead portion 412.

In the present embodiment, the connection portion 410 is connected to the left-side outer edge portion 354 of the heat generator 35. The connection portion 410 extends in a direction along the left-side outer edge portion 354.

In this case, the first lead portion 411 is connected to the lower-side end of the connection portion 410. The first lead portion 411 extends in a direction along the right-side outer edge portion 355 from the lower-side end of the connection portion 410.

In the present embodiment, the second lead portion 412 is connected to the upper-side end of the connection portion 410. The second lead portion 412 extends in a direction along the right-side outer edge portion 355 from the upper-side end of the connection portion 410.

Similarly to the above, the second electrode 42 is a negative electrode. The second electrode 42 is disposed outside the irradiation range R of the radio wave transmitted from the radio wave transmitter-receiver 4. In the present embodiment, the second electrode 42 is connected to the right-side outer edge portion 355 of the heat generator 35.

The inter-electrode non-conductive portion 50 is formed between the first electrode 41 and the second electrode 42. The inter-electrode non-conductive portion 50 includes a first gap 511, a first boundary portion 512, a second gap 521, and a second boundary portion 522.

Similarly to the above, the first gap 511 is formed between the first lead portion 411 of the first electrode 41 and the second electrode 42.

Similarly to the above, the first boundary portion 512 is a boundary portion between the heat generator 35 of the transparent conductive film 30 and the first gap 511. In the present embodiment, the first boundary portion 512 is located between the connection portion 410 of the first electrode 41 and a first end 421 of the second electrode 42 on the lower side.

Similarly to the above, the second gap 521 is formed between the second lead portion 412 of the first electrode 41 and the second electrode 42.

Similarly to the above, the second boundary portion 522 is a boundary portion between the heat generator 35 of the transparent conductive film 30 and the second gap 521. In the present embodiment, the second boundary portion 522 is located between the connection portion 410 of the first electrode 41 and a second end 422 of the second electrode 42 on the upper side.

The first lead wire 61 is connected to the upper-side end of the first lead portion 411 of the first electrode 41, in other words, is connected to a left-side end of the entire first electrode 41. The first lead wire 61 extends leftward from the upper-side end of the first lead portion 411 of the first electrode 41, and is connected to a power supply (not illustrated).

The second lead wire 62 is connected to the lower-side end of the second lead portion 412 of the first electrode 41, in other words, a left-side end of the entire first electrode 41. The second lead wire 62 extends leftward from the lower-side end of the second lead portion 412 of the first electrode 41, and is connected to the power supply (not illustrated).

The third lead wire 63 is connected to the left side of the second electrode 42. As a result, the third lead wire 63 is disposed, together with the first lead wire 61 and the second lead wire 62, on one side in a direction intersecting the vibration direction of the electric field included in the radio wave transmitted from the radio wave transmitter-receiver 4, in the present embodiment, disposed on the left side of the film heater 20. The third lead wire 63 extends leftward from a connection point between the third lead wire 63 and the second electrode 42 and is connected to a power supply (not illustrated).

The second embodiment is configured as described above. The second embodiment also provides effects similar to the effects in the first embodiment.

Third Embodiment

A third embodiment is different in the shape of the slits 311 and the shape the heat generator 35 of the transparent conductive film 30. The other components are similar to those of the first embodiment.

Similarly to the above, the slits 311 are arranged in parallel in the vibration direction of the electric field included in the radio wave transmitted from radio wave transmitter-receiver 4, in the present embodiment, arranged in parallel in the horizontal direction of vehicle 1. In addition, similarly to the above, the widths of the slits 311 are equal.

Figure 6:
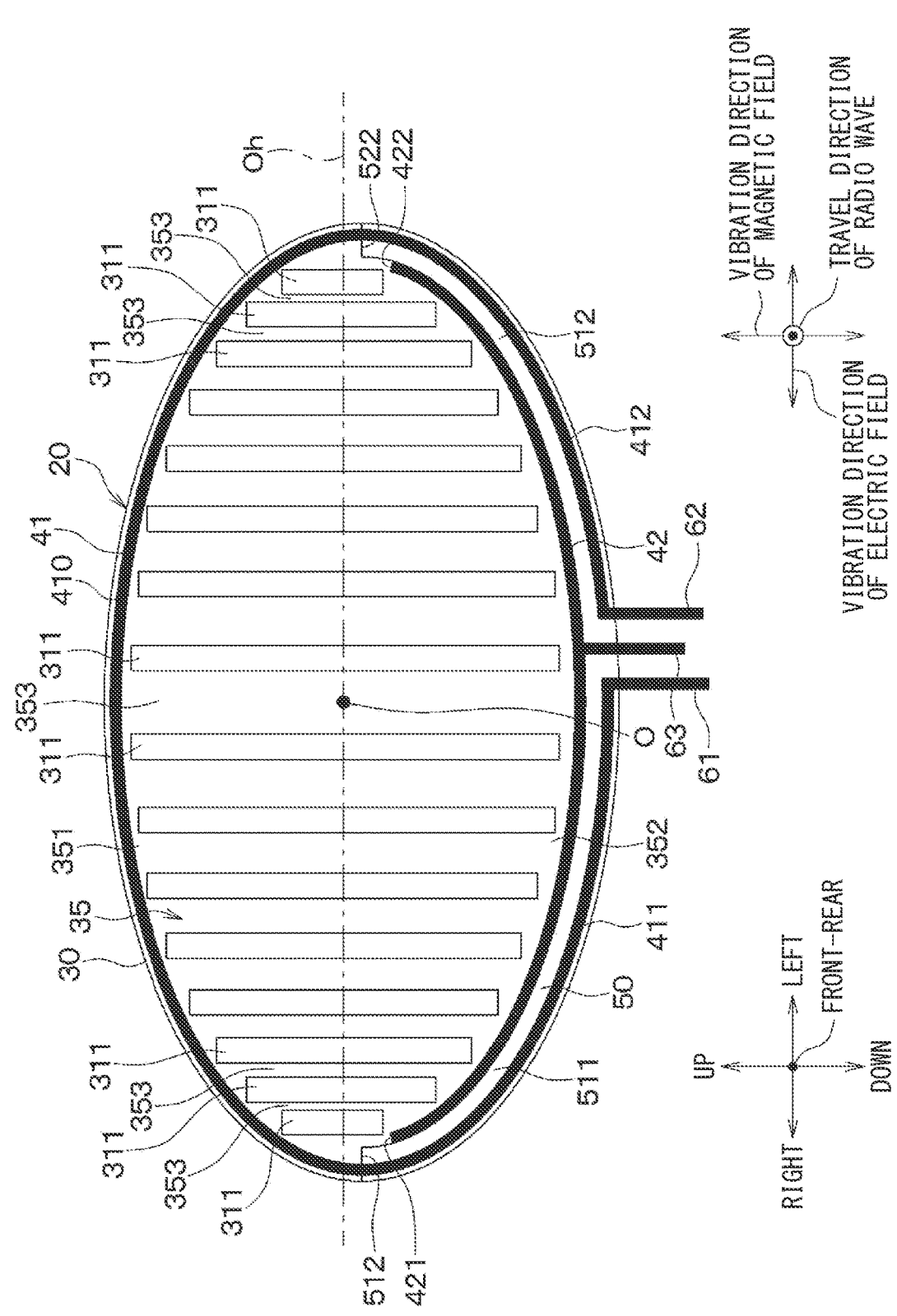
FIG. 6 is a front view of a film heater according to a third embodiment.

In the present embodiment, as illustrated in FIG. 6, the intervals at which the slits 311 are arranged are not equal to each other, and each of the distances between the slits 311 adjacent to each other decreases from the center O of the transparent conductive film 30 toward the parallel arrangement direction of the slits 311. As a result, the width of each of the conductive portions 353 decreases from the center O of the transparent conductive film 30 toward the parallel arrangement direction of the slits 311.

The third embodiment is configured as described above. The third embodiment also provides effects similar to the effects in the first embodiment. The third embodiment also provides the following effects.

In this case, since the transparent conductive film 30 has an elliptical shape as described above, the length of the transparent conductive film 30 in the vertical direction of the vehicle 1 decreases from the center O of the transparent conductive film 30 toward the horizontal direction of the vehicle 1. As a result, the length of each of the slits 311 in the vertical direction of the vehicle 1 decreases from the center O of the transparent conductive film 30 toward the parallel arrangement direction of the slits 311. In accordance with this configuration, the length of each of the conductive portions 353 in the vertical direction of the vehicle 1 decreases from the center O of the transparent conductive film 30 toward the parallel arrangement direction of the slits 311.

As a result, the electrical resistance of each of the conductive portions 353 decreases from the center O of the transparent conductive film 30 toward the parallel arrangement direction of the slits 311. As a result, the amount of heat generated by each of the conductive portions 353 increases from the center O of the transparent conductive film 30 toward the parallel arrangement direction of the slits 311.

As a result, the surface area of each of the conductive portions 353 decreases from the center O of the transparent conductive film 30 toward the parallel arrangement direction of the slits 311.

As a result, the heat generation density of each of the conductive portions 353 increases from the center O of the transparent conductive film 30 toward the parallel arrangement direction of the slits 311. In this case, the heat generation density is an amount of generated heat per unit surface area.

However, in the third embodiment, the width of each of the conductive portions 353 decreases from the center O of the transparent conductive film 30 toward the parallel arrangement direction of the slits 311. Therefore, on a cross-section orthogonal to the direction in which currents flow through the conductive portions 353, the cross-sectional area of each of the conductive portions 353 decreases from the center O of the transparent conductive film 30 toward the parallel arrangement direction of the slits 311.

As a result, the electrical resistance of each of the conductive portions 353 increases from the center O of the transparent conductive film 30 toward the parallel arrangement direction of the slits 311 as compared with the case where the width of each of the conductive portions 353 is constant. In this case, when a certain voltage is applied between the first electrode 41 and the second electrode 42 by a power supply (not illustrated), the amount of heat generated by each of the conductive portions 353 decreases from the center O of the transparent conductive film 30 toward the parallel arrangement direction of the slits 311. As a result, the heat generation density of each of the conductive portions 353 can be reduced from the center O of the transparent conductive film 30 toward the parallel arrangement direction of the slits 311 as compared with the case where the width of each of the conductive portions 353 is constant.

Therefore, it is possible to reduce the heat generation density that should be increased when the length of the conductive portion 353 becomes smaller; therefore, the differences in heat generation density among the conductive portions 353 can be reduced. Therefore, the temperature differences between the conductive portions 353 can be made smaller, and it is therefore possible to uniform the temperature of the heat generator 35, so that water such as snow or rain adhering to the emblem 5 can be uniformly removed.

Fourth Embodiment

In a fourth embodiment, the shapes of the first electrode 41, the second electrode 42, the inter-electrode non-conductive portion 50, the first lead wire 61, and the second lead wire 62 are different. The film heater 20 does not include the third lead wire 63. The other components are similar to those of the first embodiment.

Figure 7:
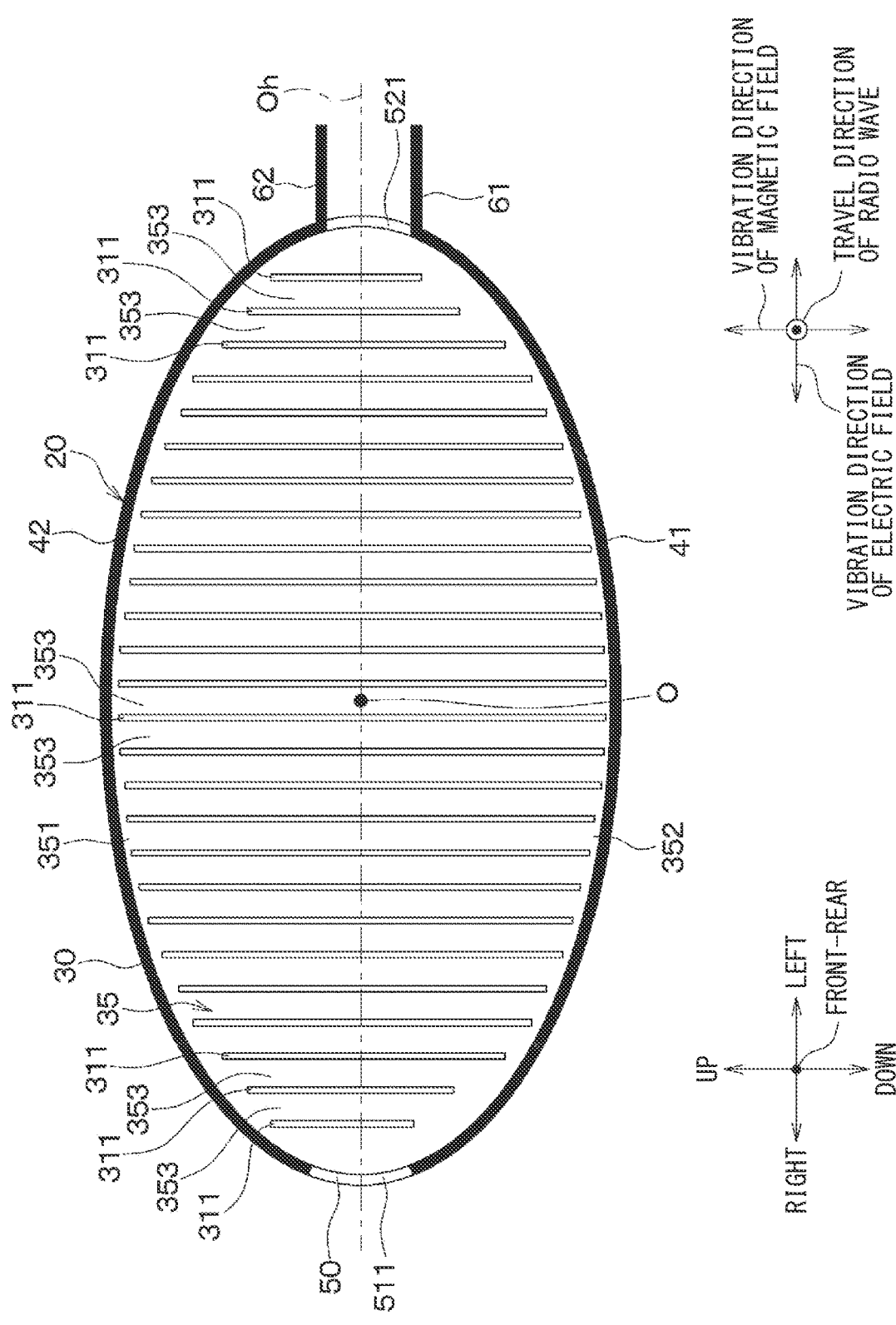
FIG. 7 is a front view of a film heater according to a fourth embodiment.

As illustrated in FIG. 7, the first electrode 41 is connected to the lower outer edge portion 352 of the heat generator 35. The first electrode 41 extends in a direction along the lower outer edge portion 352.

The second electrode 42 is connected to the upper outer edge portion 351 of the heat generator 35. The second electrode 42 extends in a direction along the upper outer edge portion 351.

The inter-electrode non-conductive portion 50 has a first gap 511 and a second gap 521.

The first gap 511 is disposed between the right-side end of the first electrode 41 and the right-side end of the second electrode 42.

The second gap 521 is disposed between the left-side end of the first electrode 41 and the left-side end of the second electrode 42. The first gap 511 and the second gap 521 prevent the chance that the first electrode 41 and the second electrode 42 will be mutually electrically conducted to each other and be short-circuited.

The first lead wire 61 is connected to the left-side end of the first electrode 41. The first lead wire 61 extends leftward of vehicle 1 from the left-side end of the first electrode 41.

The second lead wire 62 is connected to the left-side end of the second electrode 42. The second lead wire 62 extends leftward of the vehicle 1 from the left-side end of the second electrode 42. Therefore, in the present embodiment, the second lead wire 62 extends together with the first lead wire 61 in the vibration direction of the electric field included in the radio wave transmitted from the radio wave transmitter-receiver 4.

The fourth embodiment is configured as described above. The fourth embodiment also provides effects similar to the effects in the first embodiment. In the fourth embodiment, the first lead wire 61 extends together with the second lead wire 62 in the vibration direction of the electric field included in the radio wave transmitted from the radio wave transmitter-receiver 4. The first lead wire 61 and the second lead wire 62 are disposed on the side, of the film heater 20, in the vibration direction of the electric field. Therefore, the effect described in the above [1] is not provided.

Fifth Embodiment

In a fifth embodiment, the shape of the first lead wire 61 is different. The other components are similar to those of the fourth embodiment.

Figure 8:
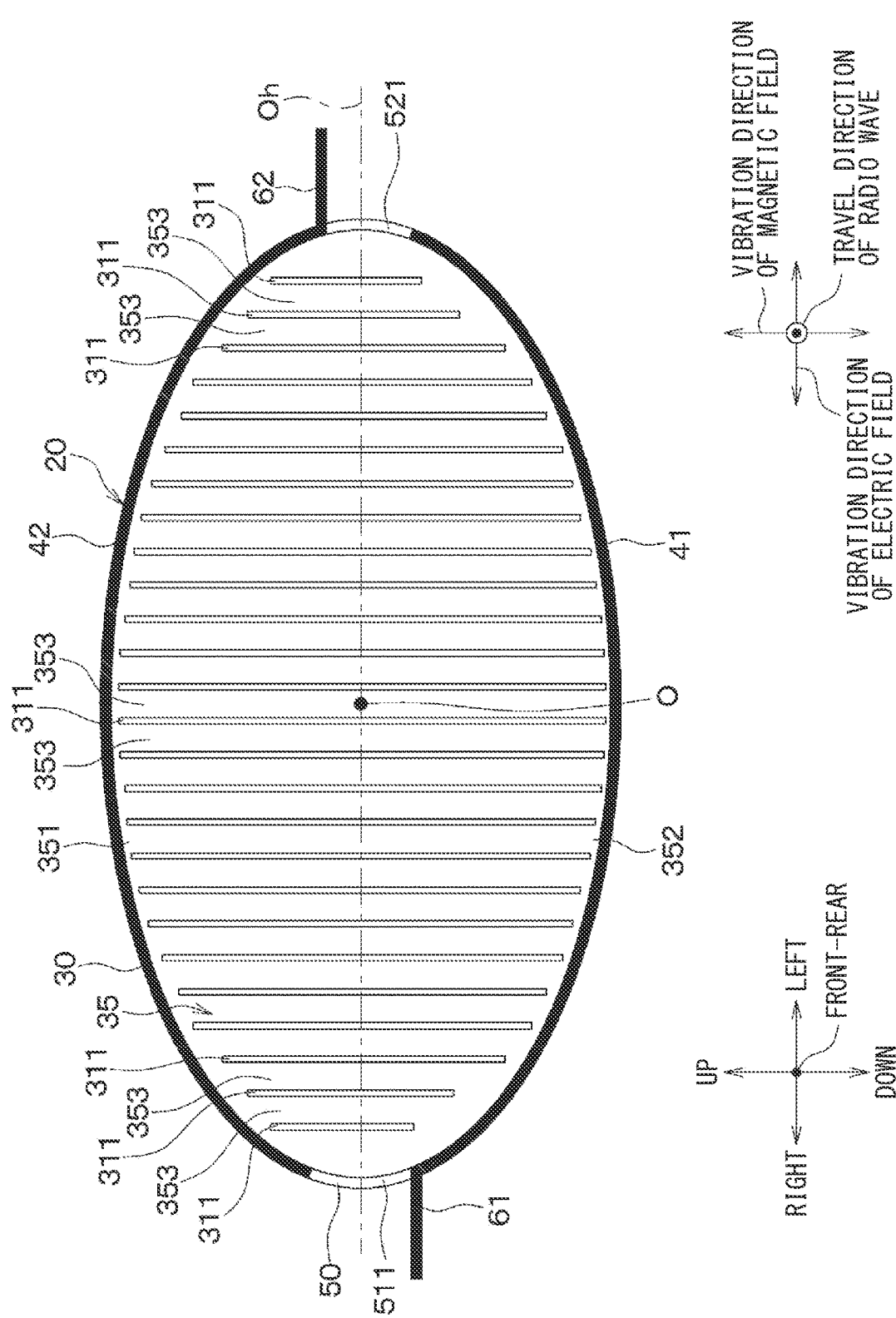
FIG. 8 is a front view of a film heater according to a fifth embodiment.

As illustrated in FIG. 8, the first lead wire 61 is connected to the left-side end of the first electrode 41. The first lead wire 61 extends leftward from the left-side end of the first electrode 41. As a result, the first lead wire 61 extends in the direction opposite to the direction in which the second lead wire 62 extends.

The fifth embodiment is configured as described above. The fifth embodiment also provides effects similar to the effects in the fourth embodiment. However, in the fifth embodiment, the first lead wire 61 is disposed on the right side with respect to the transparent conductive film 30 and the second lead wire 62 is disposed on the left side with respect to the transparent conductive film 30; therefore, the first lead wire 61 and the second lead wire 62 are not gathered. Therefore, the fifth embodiment does not provide the effect described in the above [2] as compared with the fourth embodiment.

Sixth Embodiment

In a sixth embodiment, the shapes of the first electrode 41, the second electrode 42, the inter-electrode non-conductive portion 50, the first lead wire 61, and the second lead wire 62 are different. The film heater 20 does not include the third lead wire 63. The other components are similar to those of the second embodiment.

Figure 9:
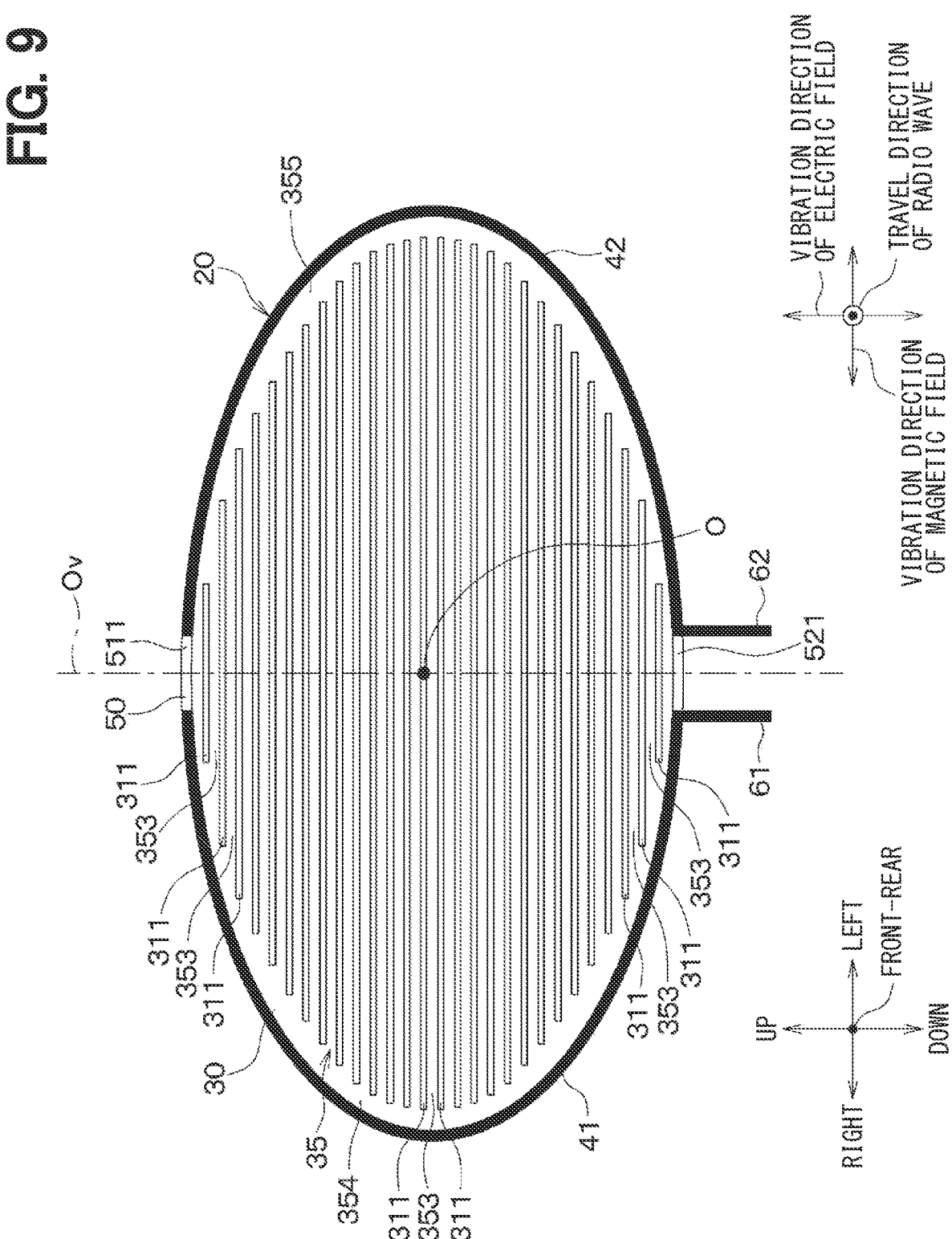
FIG. 9 is a front view of a film heater according to a sixth embodiment.

As illustrated in FIG. 9, the first electrode 41 is connected to the left-side outer edge portion 354 of the heat generator 35. The first electrode 41 extends in a direction along the left-side outer edge portion 354.

The second electrode 42 is connected to the right-side outer edge portion 355 of the heat generator 35. The second electrode 42 extends in a direction along the right-side outer edge portion 355.

The inter-electrode non-conductive portion 50 has a first gap 511 and a second gap 521.

The first gap 511 is disposed between the upper-side end of the first electrode 41 and the upper-side end of the second electrode 42.

The second gap 521 is disposed between the lower-side end of the first electrode 41 and the lower-side end of the second electrode 42. The first gap 511 and the second gap 521 prevent the chance that the first electrode 41 and the second electrode 42 will be mutually electrically conducted to each other and be short-circuited.

The first lead wire 61 is connected to the lower-side end of the first electrode 41. The first lead wire 61 extends downward of vehicle 1 from the lower-side end of the first electrode 41.

The second lead wire 62 is connected to the lower-side end of the second electrode 42. The second lead wire 62 extends downward of the vehicle 1 from the lower-side end of the second electrode 42. Therefore, in the present embodiment, the second lead wire 62 extends together with the first lead wire 61 in the vibration direction of the electric field included in the radio wave transmitted from the radio wave transmitter-receiver 4.

The sixth embodiment is configured as described above. The sixth embodiment also provides effects similar to the effects in the second embodiment. In the sixth embodiment, the first lead wire 61 extends together with the second lead wire 62 in the vibration direction of the electric field included in the radio wave transmitted from the radio wave transmitter-receiver 4. The first lead wire 61 and the second lead wire 62 are disposed on the side, of the film heater 20, in the vibration direction of the electric field. Therefore, the effect described in the above [1] is not provided.

Seventh Embodiment

In a seventh embodiment, the shape of the first lead wire 61 is different. The other components are similar to those of the sixth embodiment.

Figure 10:
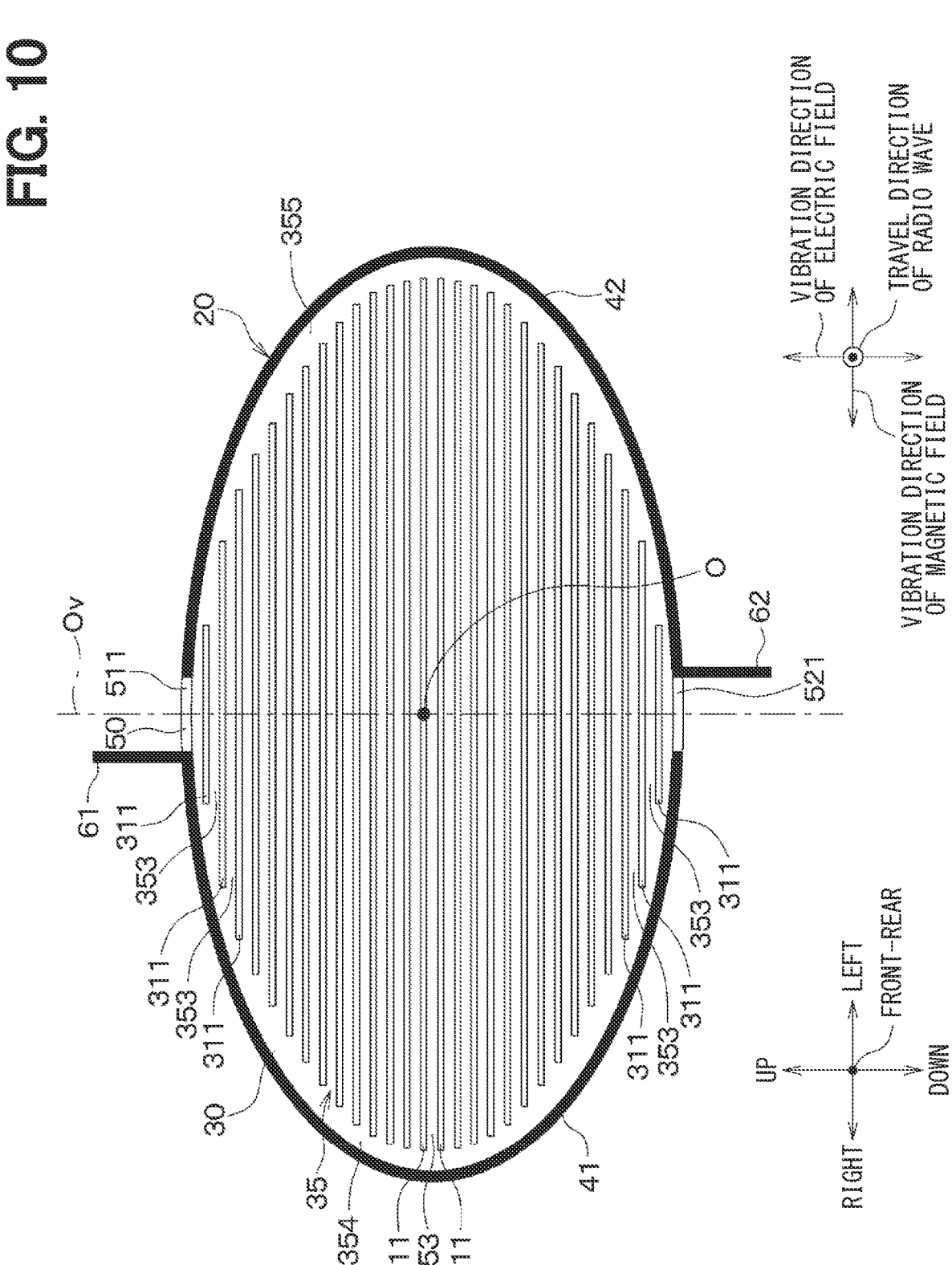
FIG. 10 is a front view of a film heater according to a seventh embodiment.

As illustrated in FIG. 10, the first lead wire 61 is connected to the upper-side end of the first electrode 41. The first lead wire 61 extends upward of vehicle 1 from the upper-side end of the first electrode 41. As a result, the first lead wire 61 extends in the direction opposite to the direction in which the second lead wire 62 extends.

The seventh embodiment is configured as described above. The seventh embodiment also provides effects similar to the effects in the sixth embodiment.

However, in the seventh embodiment, the first lead wire 61 is disposed on the upper side with respect to the transparent conductive film 30 and the second lead wire 62 is disposed on the lower side with respect to the transparent conductive film 30; therefore, the first lead wire 61 and the second lead wire 62 are not gathered. Therefore, the seventh embodiment does not provide the effect described in the above [2] as compared with the sixth embodiment.

Eighth Embodiment

In an eighth embodiment, the shapes of the first electrode 41 and the second electrode 42 are different. The other components are similar to those of the sixth embodiment.

Figure 11:
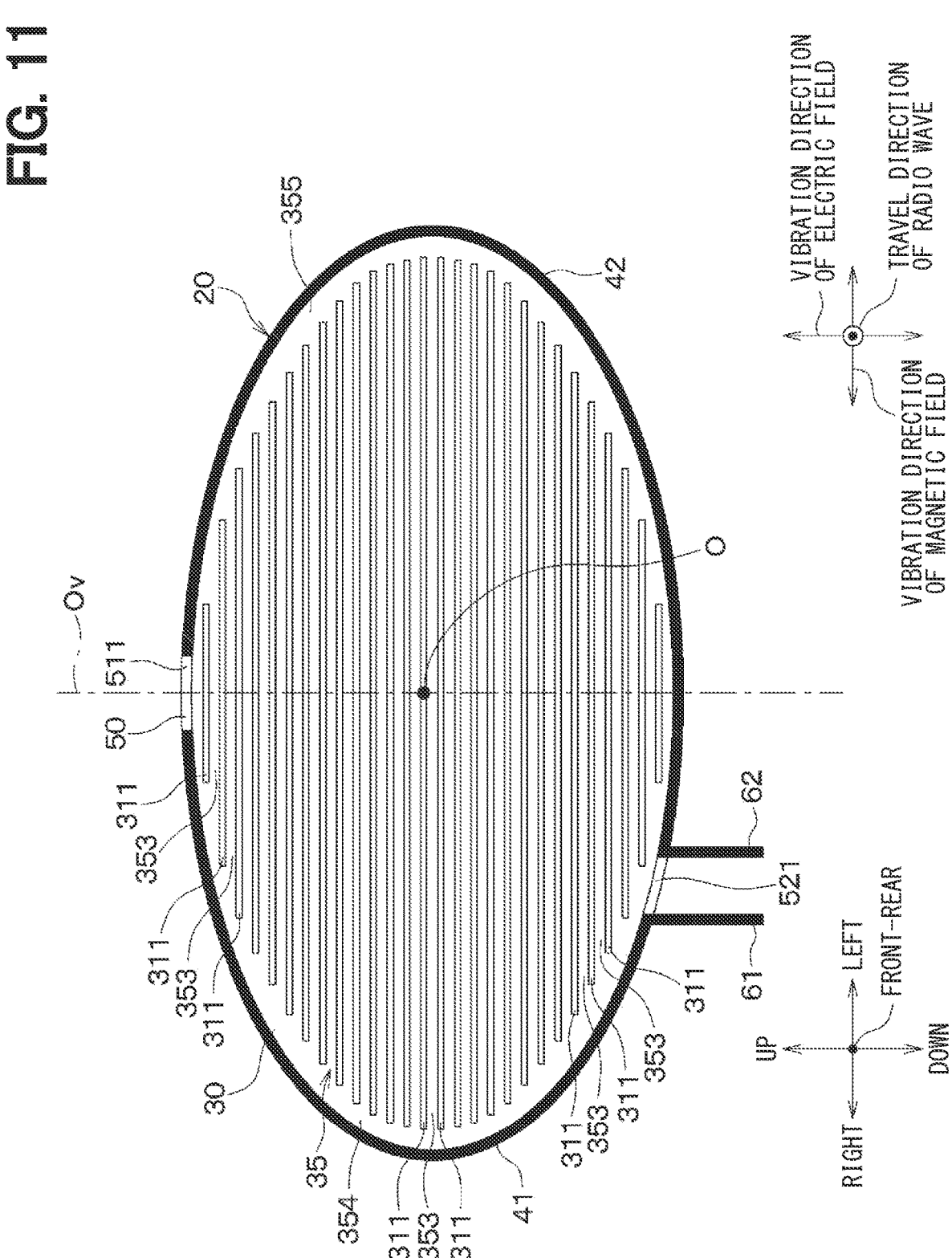
FIG. 11 is a front view of a film heater according to an eighth embodiment.

As illustrated in FIG. 11, the first electrode 41 is connected to the upper outer edge portion 351 of the heat generator 35. The length of the second electrode 42 is larger than the length of the first electrode 41. Therefore, the second electrode 42 is connected to the upper outer edge portion 351 and the lower outer edge portion 352 of the heat generator 35. As a result, the first lead wire 61 and the second lead wire 62 are located on the right side with respect to the vertical center line Ov of the heat generator 35.

The eighth embodiment is configured as described above. The eighth embodiment also provides effects similar to the effects in the sixth embodiment.

Other Embodiments

The present disclosure is not limited to the above embodiments, and modifications can be made on the above embodiments as appropriate. In each of the above embodiments, it goes without saying that any element constituting the embodiment is not necessarily essential except the following cases: the case where it is explicitly stated that such element is particularly essential; and the case where it can be considered that such element is obviously essential in principle.

In the above embodiments, the emblem 5 is disposed on the front grille 2 of the vehicle 1. However, the emblem 5 does not have to be disposed on the front grille 2 of the vehicle 1, and may be disposed on the body of the vehicle 1, for example. In the above embodiments, the base member 10 of the emblem 5 is formed in an elliptical plate shape. However, the base member 10 does not have to be formed in an elliptical plate shape, and the base member 10 may be formed in a disk shape or a polygonal plate shape, for example.

In the above embodiments, the film heater 20 is disposed on the emblem 5. However, the film heater 20 does not have to be disposed on the emblem 5. For example, in a case where the radio wave transmitter-receiver is disposed near the windshield in the cabin of the vehicle 1, in the headlight 3, or the like, the film heater 20 may be disposed on the windshield or the headlight 3.

In the above embodiments, the first electrode 41 of the film heater 20 is a positive electrode, and the second electrode 42 is a negative electrode. However, the first electrode 41 does not have to be a positive electrode, and the second electrode 42 does not have to be a negative electrode. The first electrode 41 and the second electrode 42 may be respectively a negative electrode and a positive electrode.

In the above embodiments, the slits 311 contain air or the like having electrical insulation properties. However, the slits 311 do not have to contain gas such as air. For example, the slits 311 may be filled with a solid such as a resin having electrical insulation properties.

In the above embodiments, the first gap 511 and the second gap 521 of the inter-electrode non-conductive portion 50 contain air or the like having electrical insulation properties. However, the first gap 511 and the second gap 521 of the inter-electrode non-conductive portion 50 do not have to contain gas such as air. Similarly to the above, the first gap 511 and the second gap 521 of the inter-electrode non-conductive portion 50 may be filled with a solid such as a resin having electrical insulation properties resin.

In the above embodiments, the transparent conductive film 30 includes a slits 311. However, the number of the slits 311 does not have to be plural. The number of slits 311 may be one. Therefore, it is enough that at least one slit 311 is included. When the number of the slits 311 is one, the heat generator 35 is divided into two pieces, so that the number of the conductive portions 353 is two.

Figure 12:
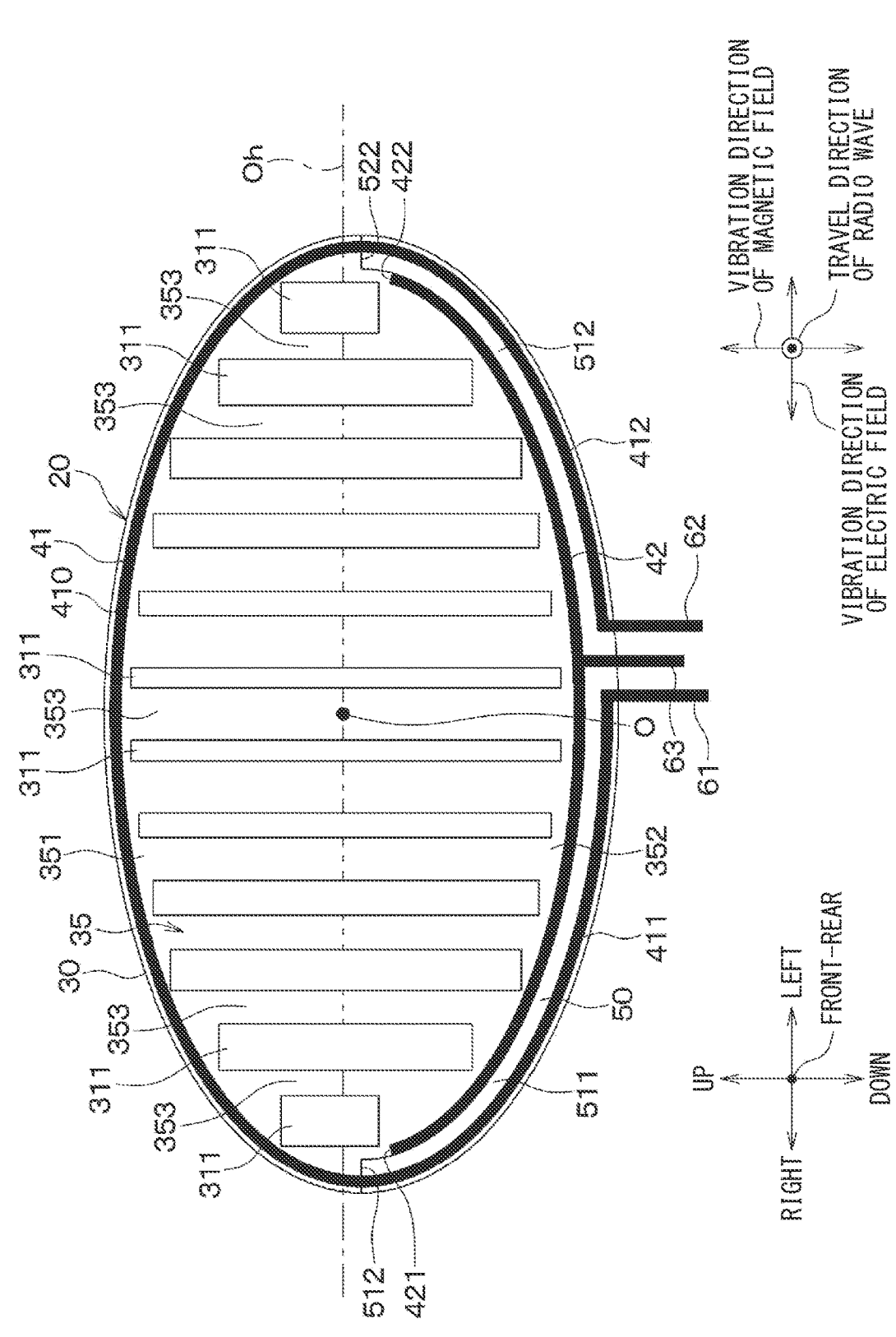
FIG. 12 is a front view of a film heater according to another embodiment.

In the third embodiment, each of the distances between the slits 311 adjacent to each other decreases from the center O of the transparent conductive film 30 toward the parallel arrangement direction of the slits 311. As a result, the width of each of the conductive portions 353 decreases from the center O of the transparent conductive film 30 toward the parallel arrangement direction of the slits 311. However, each of the distances between the slits 311 adjacent to each other does not have to decrease from the center O of the transparent conductive film 30 toward the parallel arrangement direction of the slits 311. For example, as illustrated in FIG. 12, as each of the distances between the slits 311 adjacent to each other becomes smaller from the center O of the transparent conductive film 30 toward the parallel arrangement direction of the slits 311, the width of each of the slits 311 may increase. As a result, similarly to the above, the width of each of the conductive portions 353 decreases from the center O of the transparent conductive film 30 toward the parallel arrangement direction of the slits 311. However, the following configuration may be employed. The slits 311 are arranged at equal intervals, and at the same time, the width of each of the slits 311 increases from the center O of the transparent conductive film 30 toward the parallel arrangement direction of the slits 311.

In the third embodiment, the width of each of the conductive portions 353 decreases from the center O of the transparent conductive film 30 toward the parallel arrangement direction of the slits 311. As a result, on a cross-section orthogonal to the direction in which currents flow through the conductive portions 353, the cross-sectional area of each of the conductive portions 353 decreases from the center O of the transparent conductive film 30 toward the parallel arrangement direction of the slits 311. However, the width of each of the conductive portions 353 does not have to decrease from the center O of the transparent conductive film 30 toward the parallel arrangement direction of the slits 311. For example, each of the thicknesses of the conductive portions 353 may decrease from the center O of the transparent conductive film 30 toward the parallel arrangement direction of the slits 311. Also with this configuration, on the cross-section orthogonal to the direction in which the currents flow through the conductive portions 353, the cross-sectional area of each of the conductive portions 353 decreases from the center O of the transparent conductive film 30 toward the parallel arrangement direction of the slits 311.

In the third embodiment, the length, in the direction in which the slits 311 extend, of each of the conductive portions 353 decreases from the center O of the transparent conductive film 30 toward the parallel arrangement direction of the slits 311. However, the length, in the direction in which the slits 311 extend, of each of the conductive portions 353 does not have to decrease from the center O of the transparent conductive film 30 toward the parallel arrangement direction of the slits 311. For example, the length, in the direction in which the slits 311 extend, of each of the conductive portions 353 may increase from the center O of the transparent conductive film 30 toward the parallel arrangement direction of the slits 311.

In this case, the width or thickness of each of the conductive portions 353 increases from the center O of the transparent conductive film 30 toward the parallel arrangement direction of the slits 311. As a result, on a cross-section orthogonal to the direction in which currents flow through the conductive portions 353, the cross-sectional area of each of the conductive portions 353 increases from the center O of the transparent conductive film 30 toward the parallel arrangement direction of the slits 311.

As a result, the electrical resistance of each of the conductive portions 353 decreases from the center O of the transparent conductive film 30 toward the parallel arrangement direction of the slits 311 as compared with the case where the width and thickness of each of the conductive portions 353 are constant. In this case, when a certain voltage is applied between the first electrode 41 and the second electrode 42 by a power supply (not illustrated), the amount of heat generated by each of the conductive portions 353 increases from the center O of the transparent conductive film 30 toward the parallel arrangement direction of the slits 311. As a result, the heat generation density of each of the conductive portions 353 can be made larger from the center O of the transparent conductive film 30 toward the parallel arrangement direction of the slits 311 as compared with the case where the width and thickness of each of the conductive portions 353 are constant.

Therefore, it is possible to increase the heat generation density that will be decreased when the length of the conductive portion 353 increases; therefore, the differences among the heat generation densities of the conductive portions 353 can be reduced. Therefore, similarly to the above, the temperature differences between the conductive portions 353 can be made smaller, and it is therefore possible to uniform the temperature of the heat generator 35, so that water such as snow or rain adhering to the emblem 5 can be uniformly removed.

The above embodiments may be combined as appropriate.
Overview

According to a first aspect described in part or all of the above embodiments, a film heater includes: (i) a transparent conductive portion, the transparent conductive portion including: at least one non-conductive portion that has electrical insulation properties and extends in a direction intersecting a vibration direction of an electric field included in a radio wave transmitted from a radio wave transmitter-receiver; and a heat generator that generates heat by being energized and that transmits light; (ii) a first electrode connected to the heat generator; and (iii) a second electrode connected to the heat generator. The heat generator includes at least one conductive portion that is adjacent to the non-conductive portion and generates heat by a current flowing along a direction in which the non-conductive portion extends when the heat generator is energized by the first electrode and the second electrode.

Since the non-conductive portion has electrical insulation properties, the non-conductive portion hardly absorbs the radio wave transmitted from the radio wave transmitter-receiver. For this reason, attenuation of radio waves such as millimeter waves is reduced. In addition, the non-conductive portion extends in a direction intersecting the vibration direction of the electric field included in the radio wave transmitted from the radio wave transmitter-receiver. As a result, a length of the conductive portion of the heat generator in the vibration direction of the electric field is smaller. Therefore, the portion of the heat generator that is dielectrically polarized by an action of the electric field included in the radio wave is smaller. This reduces absorption of the energy of the radio wave and conversion of the energy into thermal energy that are caused by the dielectric polarization of the heat generator due to the action of the electric field included in the radio wave. As a result, attenuation of radio waves such as millimeter waves is reduced.

According to a second aspect, the film heater further includes: a first lead wire connected to the first electrode; and a second lead wire connected to the second electrode. The first lead wire is disposed, together with the second lead wire, on one side in the direction intersecting the vibration direction of the electric field. As a result, similarly to the above, the length of each of the first lead wire and the second lead wire in the vibration direction of the electric field can be made smaller. Therefore, similarly to the above, attenuation of radio waves such as millimeter waves is reduced. As a result, the first lead wire and the second lead wire are gathered and therefore can be easily connected to a power supply (not illustrated).

According to a third aspect, the first electrode is disposed outside the heat generator with respect to the second electrode and surrounds the second electrode, and the film heater further includes an inter-electrode non-conductive portion having electrical insulation properties and disposed between the first electrode and the second electrode. This configuration prevents or reduces the chance that the first electrode and the second electrode will be electrically conducted to each other and be short-circuited.

According to a fourth aspect, the first electrode, the second electrode, and the inter-electrode non-conductive portion extend in a direction along an outer edge portion of the heat generator. This configuration prevents or reduces the chance that the first electrode and the second electrode will be electrically conducted to each other and be short-circuited.

According to a fifth aspect, the inter-electrode non-conductive portion has a boundary portion between the inter-electrode non-conductive portion and the heat generator, and the boundary portion is disposed between a connection portion of the first electrode at which the first electrode and the heat generator are connected to each other and an end of the second electrode. This configuration prevents or reduces the chance that the first electrode and the second electrode will be electrically conducted to each other and be short-circuited.

According to a sixth aspect, the first electrode and the second electrode are disposed outside an irradiation range of the radio wave transmitted from the radio wave transmitter-receiver. This configuration reduces absorption of the energy of the radio wave and conversion of the energy into thermal energy that are caused by the dielectric polarization of the first electrode and the second electrode due to an action of the electric field included in the radio wave. Therefore, attenuation of radio waves such as millimeter waves is reduced.

According to a seventh aspect, the transparent conductive portion includes plural non-conductive portions, the plural non-conductive portions are arranged in parallel in the vibration direction of the electric field, the heat generator includes a plurality of the conductive portions, and the plurality of the conductive portions are arranged in parallel in a parallel arrangement direction of the non-conductive portions.

According to an eighth aspect, a length of each of the plurality of the conductive portions in a direction in which the non-conductive portions extend becomes larger or smaller from a center of the transparent conductive portion toward the parallel arrangement direction of the non-conductive portions, and a cross-sectional area of each of the plurality of the conductive portions on a cross-section orthogonal to a direction in which currents flow through the conductive portions becomes larger or smaller, from the center of the transparent conductive portion toward the parallel arrangement direction of the non-conductive portions, in a same manner as the lengths of the conductive portions become larger or smaller. This configuration can reduce the differences in heat generation density among the plurality of conductive portions.

What is claimed is:

1. A film heater comprising:
a transparent conductive portion including:
  at least one non-conductive portion that has electrical insulation properties and extends in a direction intersecting a vibration direction of an electric field included in a radio wave transmitted from a radio wave transmitter-receiver; and
  a heat generator that generates heat by being energized and that transmits light;
a first electrode connected to the heat generator; and
a second electrode connected to the heat generator, wherein
the heat generator includes at least one conductive portion that is adjacent to the non-conductive portion and generates heat by a current flowing along a direction in which the non-conductive portion extends when the heat generator is energized by the first electrode and the second electrode, and
the first electrode is disposed outside the heat generator with respect to the second electrode and surrounds the second electrode, the film heater further comprising:

an inter-electrode non-conductive portion having electrical insulation properties and disposed between the first electrode and the second electrode.

2. The film heater according to claim 1, further comprising:
a first lead wire connected to the first electrode; and
a second lead wire connected to the second electrode, wherein
the first lead wire is disposed, together with the second lead wire, on one side in the direction intersecting the vibration direction of the electric field.

3. The film heater according to claim 1, wherein the first electrode, the second electrode, and the inter-electrode non-conductive portion extend in a direction along an outer edge portion of the heat generator.

4. The film heater according to claim 3, wherein the inter-electrode non-conductive portion has a boundary portion between the inter-electrode non-conductive portion and the heat generator, and
the boundary portion is disposed between a connection portion of the first electrode at which the first electrode and the heat generator are connected to each other and an end of the second electrode.

5. The film heater according to claim 1, wherein the first electrode and the second electrode are disposed outside an irradiation range of the radio wave transmitted from the radio wave transmitter-receiver.

6. The film heater according to claim 1, wherein the transparent conductive portion includes a plurality of non-conductive portions,
the plurality of non-conductive portions is arranged in parallel in the vibration direction of the electric field,
the heat generator includes a plurality of conductive portions, and
the plurality of conductive portions is arranged in parallel in a parallel arrangement direction of the non-conductive portions.

7. The film heater according to claim 6, wherein a length of each of the plurality of conductive portions in a direction in which the non-conductive portions extend is changed in the parallel arrangement direction of the non-conductive portions from a center of the transparent conductive portion, and
a cross-sectional area of each of the plurality of conductive portions on a cross-section orthogonal to a direction in which currents flow through the conductive portions is changed in the parallel arrangement direction of the non-conductive portions from the center of the transparent conductive portion, in a same manner as the length of the conductive portion.

* * * * *